United States Patent
Koch et al.

(10) Patent No.: US 8,572,195 B2
(45) Date of Patent: Oct. 29, 2013

(54) SYSTEMS AND METHODS FOR REMOTE ACCESS TO A DISPLAY-BASED BULLETIN BOARD IN A SHARED USER ENVIRONMENT

(75) Inventors: Robert A. Koch, Norcross, GA (US); Scott C. Holt, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 65 days.

(21) Appl. No.: 13/172,003

(22) Filed: Jun. 29, 2011

(65) Prior Publication Data

US 2012/0066319 A1 Mar. 15, 2012

Related U.S. Application Data

(63) Continuation of application No. 11/230,018, filed on Sep. 19, 2005, now Pat. No. 7,996,472, which is a continuation of application No. 10/029,149, filed on Dec. 28, 2001, now Pat. No. 6,968,362.

(51) Int. Cl.
*G06F 15/16* (2006.01)

(52) U.S. Cl.
USPC .......................................................... 709/206

(58) Field of Classification Search
USPC ..................... 709/204–206; 715/733, 33, 752
See application file for complete search history.

(56) References Cited

U.S. PATENT DOCUMENTS

| | | | |
|---|---|---|---|
| 5,821,931 A | 10/1998 | Berquist et al. | |
| 6,196,047 B1 * | 3/2001 | Carnegie et al. | 73/1.11 |
| 6,342,901 B1 | 1/2002 | Adler et al. | |
| 6,393,848 B2 | 5/2002 | Roh et al. | |
| 6,484,196 B1 * | 11/2002 | Maurille | 709/206 |
| 6,496,849 B1 | 12/2002 | Hanson et al. | |
| 6,529,942 B1 | 3/2003 | Gilbert | |
| 6,690,912 B1 | 2/2004 | Vaughn | |
| 6,692,436 B1 | 2/2004 | Bluth et al. | |
| 6,910,189 B2 | 6/2005 | Abdelhadi et al. | |
| 6,928,270 B2 | 8/2005 | Tighe | |
| 7,013,429 B2 | 3/2006 | Fujimoto et al. | |
| 7,020,696 B1 * | 3/2006 | Perry et al. | 709/223 |
| 2002/0047868 A1 * | 4/2002 | Miyazawa | 345/835 |
| 2002/0063732 A1 | 5/2002 | Mansikkaniemi et al. | |
| 2002/0065881 A1 | 5/2002 | Mansikkaniemi et al. | |
| 2002/0143636 A1 * | 10/2002 | Carignani | 705/26 |
| 2002/0196294 A1 | 12/2002 | Sesek | |
| 2003/0003936 A1 | 1/2003 | Tighe | |
| 2003/0020749 A1 | 1/2003 | Abu-Hakima et al. | |
| 2007/0050459 A1 | 3/2007 | Kikugawa | |
| 2008/0229217 A1 * | 9/2008 | Kembel et al. | 715/760 |

OTHER PUBLICATIONS

Brown, Mark R., "Using Netscape 2", QUE, pp. 327-375 (1995).

* cited by examiner

*Primary Examiner* — Lance L Barry
(74) *Attorney, Agent, or Firm* — Parks IP Law LLC; Jennifer P. Medlin, Esq.

(57) ABSTRACT

An electronic bulletin board for use in a shared always-on environment wherein a user may manipulate messages from a remote location. The electronic bulletin board may be implemented via database and programming logic on an application server accessible from any network node, including wireless devices. The always-on environment may be set up on a computer or broadband internet appliance or other communications device. Remote users may perform operations such as updating an existing message, posting a new message, download messages, and the like. The bulletin board also supports shared messages designed for special purposes, for example, an electronic grocery list that is accessible from remote locations.

12 Claims, 4 Drawing Sheets

| EMAIL ADDRESS | DOMAIN | DESTINATION ADDRESS | USERNAME | PASSWORD |
|---|---|---|---|---|
| JANE@JANESWORK.COM | JONESHOME.COM | 192.100.2.10 | JJONES | ******* |
| STEVE_DOE@HISWORK.COM | JONESHOME.COM | 192.100.2.10 | SJONES | ******* |
| WILLIAM_DOE@SCHOOL.COM | JONESHOME.COM | 192.100.2.10 | WJONES | ******* |
| JENNY_DOE@SCHOOL.COM | JONESHOME.COM | | JEJONES | ******* |
| FRED@MOBILE.COM | BUSINESS.COM | SMITHGW.COM | FSMITH | ******* |
| JIM@WIRELESS.COM | BUSINESS.COM | SMITHGW.COM | JWHITE | ******* |

FIG. 4A

| SENDER EMAIL ADDRESS | RECIPIENT EMAIL ADDRESS | SENDER NAME | RECIPIENT NAME |
|---|---|---|---|
| JANE@JANESWORK.COM | BILLY@JONESHOME.COM | MOM | BILLY |
| JANE@JANESWORK.COM | JANE@JONESHOME.COM | MOM | JANE |
| JANE@JANESWORK.COM | STEVE@JONESHOME.COM | JANE | STEVE |
| JANE@JANESWORK.COM | ALL@JONESHOME.COM | MOM | STEVE & KIDS |

FIG. 4B

SYSTEMS AND METHODS FOR REMOTE ACCESS TO A DISPLAY-BASED BULLETIN BOARD IN A SHARED USER ENVIRONMENT

CROSS-REFERENCE TO RELATED APPLICATION

This application is a continuation of U.S. patent application Ser. No. 11/230,018, filed Sep. 19, 2005, the entirety of which is herein incorporated by reference.

FIELD OF THE INVENTION

The present invention relates generally to messaging systems, and more particularly to electronic messaging systems.

BACKGROUND OF THE INVENTION

Today's work and home lifestyles can be very busy for many families. In many cases, individual family members may be involved in multiple activities. Oftentimes, individual family members may have very little personal interaction. In some such families, a bulletin board, chalk board or other manual messaging systems may be used to provide some means of communication between members of the household. In some households, notes may be placed on the refrigerator or other commonly used appliances. Message areas may include a place for leaving notes of interest to the entire household, such as reminders for group events or grocery lists. In some households, the message area may be divided into various sub-areas allowing messages to be easily targeted to one or more household members.

Such messaging systems are also commonly used in a variety of offices or other work spaces. For example, a bulletin board system may be used to let others in the work place know of an individual's whereabouts. A bulletin board may also be used to post important messages for employees' attention.

A problem with the above-described messaging systems in that an individual must be near the location of bulletin board to be able to post or read messages on the board. That is, conventional message systems do not provide a convenient method to manage notes posted in a shared environment from a remote location. For example, if a user is away from home when he or she desires to post a message to the bulletin board, that user would not be able to post the message until he or she returns home. By this time, the intended recipient of the message may have already departed the home, thereby missing the communication from the user. In another example, a message cannot be removed from the messaging area unless the user is physically near the messaging system. Similarly, a user cannot post a new message or update an existing messaging from a remote location.

Another problem with conventional messaging systems is that it is difficult to determine whether or not one or more of the intended recipients have read the note. For example, in conventional bulletin boards, even if a reader of a note initials the note or otherwise marks it to show it has been read, other users of the bulletin board must still physically review the board to receive the notification.

Conventional messaging systems also do not provide convenient means for creating a transportable copy of any messages posted thereon. Currently, if a user wants to take a copy of a message away from the messaging system, the user must manually copy a note onto a separate piece of paper. Alternatively, if the note was posted using a paper that may be removed from the board (e.g., pinned or taped to a bulletin board) the user may physically remove note and take the message away from the messaging system. However, if a note is removed from the message board then others members of the household or workplace will not be able to read the note.

SUMMARY OF THE INVENTION

The present invention uses a broadband-enabled internet connection to provide an always-on interface to a virtual family, group, or office bulletin board system. Family members (or, e.g., associates or co-workers) may use this shared environment to communicate with one another either locally or remotely (e.g., using any email- or other web-capable device). The system allows users to print, reply to messages, and hot link to embedded web uniform resource locators (URLs) from within a posted message.

The present invention also provides the capability to create, share and modify "common notes" (e.g., a shopping list) that can be written to or retrieved by anyone, whether in a remote location or not. Accordingly, the present invention provides systems and methods enabling a user to update the bulletin board whenever a need arises. For example, if a user is on his way home from work when he decides to stop at a grocery store, he may retrieve a current version of the shopping list by sending an email or other command to an application server. The application server responds to the request and sends a copy of the list to the user. Further, the user may send a request to update the bulletin board to reflect his intent to purchase the items from the list. In another example, a user, for example, a child, may be informed at school of some item he needs to bring to school. The child may send a message to update the shopping list with the additional item. In this manner, there is less chance of the child forgetting to inform the parents that an item is needed.

BRIEF DESCRIPTION OF THE DRAWINGS

FIGS. 4A and 4B are exemplary tables that may be maintained in a customer database in an embodiment of the present invention.

DETAILED DESCRIPTION OF THE INVENTION

Figure 1:
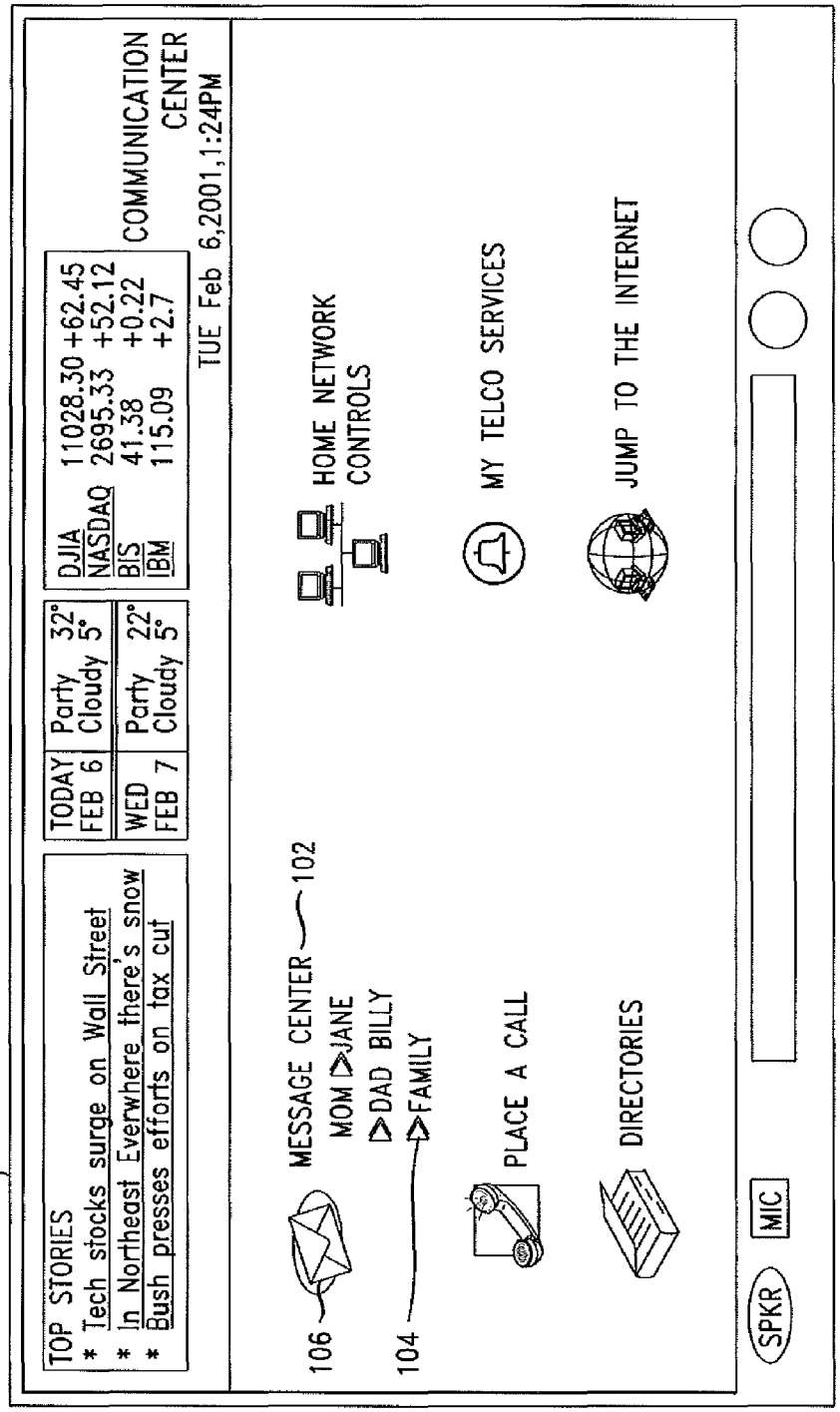
FIG. 1 is a schematic diagram showing an exemplary user-interface that may be used in an embodiment of the present invention.

An embodiment of the present invention comprises an "always-on" electronic bulletin board system that may be remotely manipulated by users. Remote manipulation may include, for example, reading one or more notes posted on the bulletin board, posting one or more notes to the bulletin board, deleting one or more notes from the bulletin board, acknowledging receipt of a note posted on the bulletin board, and the like. FIG. 1 shows an exemplary display device, communications center 100, that may be used to display an electronic bulletin board according to an embodiment of the present invention. Communications center 100 may optionally include a memory, a central processing unit and computer programming logic for controlling the device. FIG. 1 shows a display of an exemplary graphical user interface for providing various communications systems via communications center 100.

An electronic messaging system according to an embodiment of the present invention may be provided as an option, such as message center 102 on communications center 100. Message indicators, for example indicator 104, may be used to provide a visual alert to one or more family members that a message has been posted for their attention. As shown in FIG. 1, message center 102 may include a separate area for each family member (or workplace user) and a collective "family" (or workplace) area. In this embodiment, a user in the household (or workplace) may access the message center (e.g., by clicking on icon 106) to manipulate messages in the communications center. As will be described in greater detail herein, remote users may also access the communication center to manipulate messages.

Figure 2:
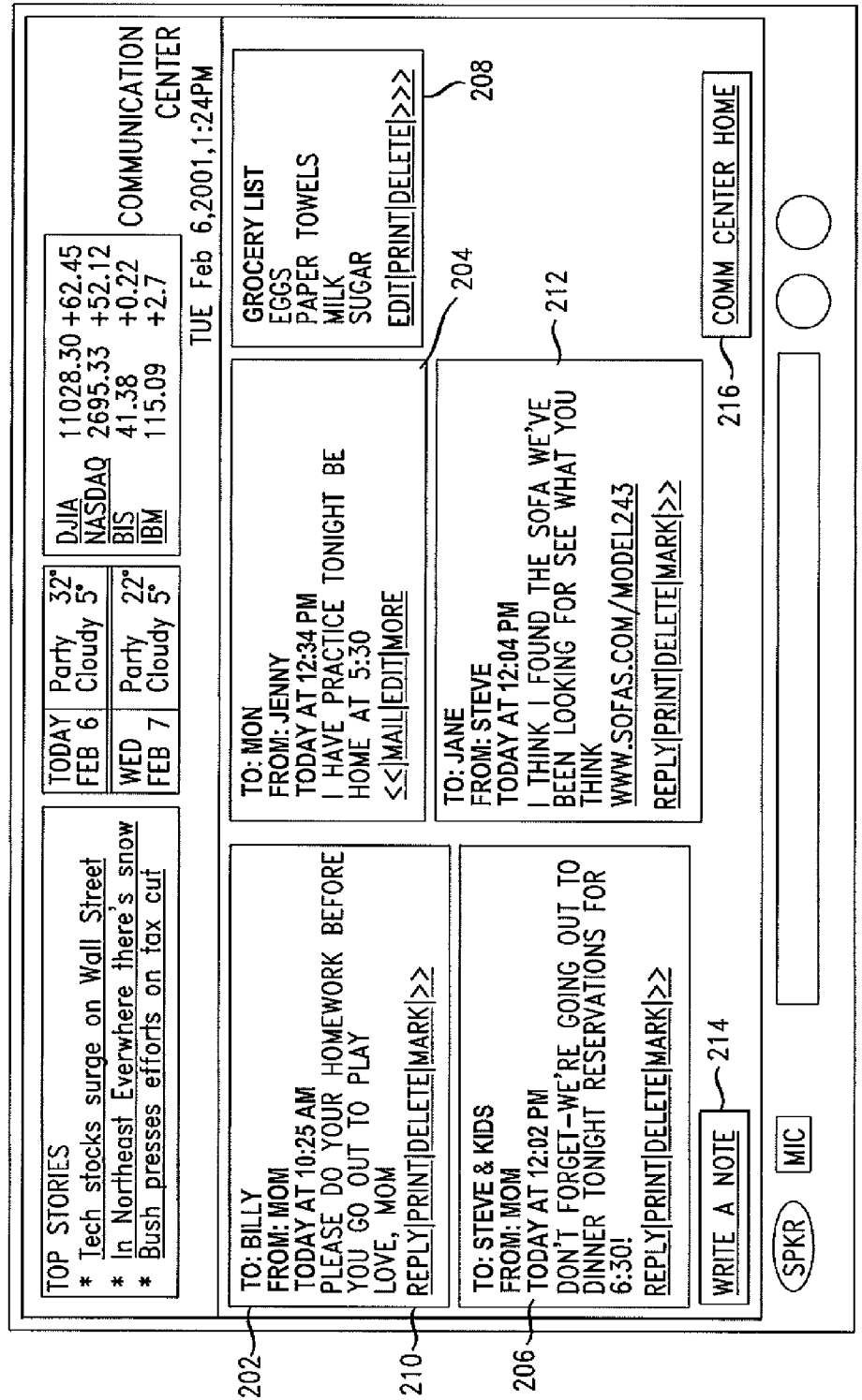
FIG. 2 is a schematic diagram showing an exemplary electronic bulletin board according to an embodiment of the present invention.

FIG. 2 shows an exemplary graphical user interface that may be displayed in embodiments of the present invention when a user clicks on icon 106. Alternatively, the interface shown in FIG. 2 may be displayed on communications center 100 when the device is idle. For example, the bulletin board may automatically be displayed in a manner similar to that of a "screen saver" commonly used on personal computer systems. As would be apparent to one of ordinary skill in the art, other visual display layouts may be used to convey the message information to users. For example, a text-based interface may be used in embodiments of the present invention. In another example, the messages may include audio and/or video clips providing multimedia communications via the bulletin board system.

As shown in FIG. 2, in an exemplary embodiment, messages may be posted to the bulletin board and addressed to particular members of the household (or workplace). For example, message 202 is addressed to "Billy" whereas message 204 is addressed to "Mom." Similarly, messages may be address to "All" members of the household (or workplace) such as message 206, or may comprise a universal message, such as grocery list 208.

In the exemplary embodiment shown in FIG. 2 each message includes a menu bar 210 providing options for manipulating the message. Options may allow a user to reply to a message ("Reply"), print a message to a printer device attached to communications center 100 or another printer device accessible on a network ("Print"), delete a message from the display area ("Delete"), mark a message as read ("Mark"), mail a message to some other system ("Mail"), edit a message ("Edit") and read extended messages ("More"). Other options may be provided in alternative embodiments of the present invention. Moreover, the menu of options need not be provided individually on each message. That is, a single menu may be used to manipulate selected messages. Alternatively, other user interface options may be implemented to present the menu of options to a user (e.g., "right-clicking" on a message may result in a menu being displayed).

An embodiment of the present invention also allows a user to post messages including links to web pages. For example, message 212 from "Steve" to "Jan" includes a uniform resource locator (URL) that the author wants the recipient to review. When Jane reads message 212, she may click on the link to view the web page.

An embodiment of the present invention may include additional option buttons such as, for example, buttons 214 and 216 providing other options for the user. In this example, button 214 allows a user to create a new message to be posted on the bulletin board and button 216 allows the user to return to a main screen, such as shown in FIG. 1.

Figure 3:
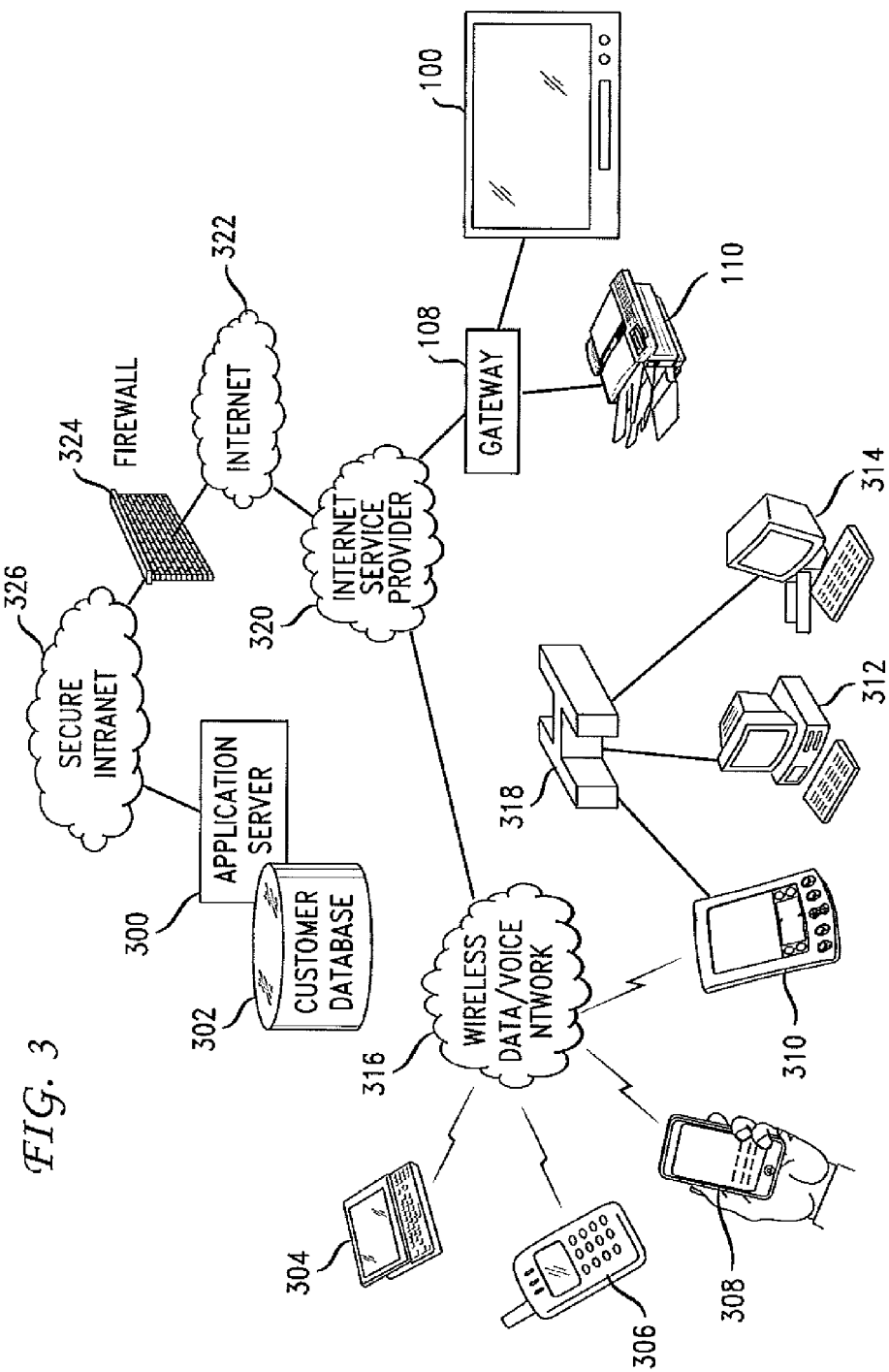
FIG. 3 is a schematic diagram showing an architecture that may be used to implement an embodiment of the present invention.

FIG. 3 shows an architecture that may be used to implement an embodiment of the present invention. In this embodiment, the primary logic for providing a service according to the present invention is provided by application server 300 and customer database 302. Application server 300 may be any computer system, which would typically include a central processing unit, a volatile memory and a non-volatile memory. Customer database 302 may be part of application server 300 or may be on a different computer system. In this embodiment, customer database 302 includes records mapping a user's email address to the user's bulletin board address. The database may also include an IP address associated with particular users and may include user authentication information. FIG. 4A shows an example of records 400 that may be stored in customer database 302. The mapping provided by customer database 302 may be used in an embodiment to simplify the displayed names for a sender and recipient of a message, as described below.

In an embodiment implemented as shown in FIG. 3, a user may post messages to the electronic bulletin board by sending an instruction via an email sent to a specified address. The email is processed by application server 300 which generates a message to send to communications center 100. The email may be sent from any email-enabled device, including, for example, interactive pager 304, wireless telephone 306, wireless personal digital assistant (PDA) 308, handheld computer 310, computer 312, internet appliance 314, and the like. Moreover, as shown in FIG. 3, the devices may transmit the email message via any standard data path to which the devices are adapted. For example, devices 304-310 may be adapted to transmit email via wireless voice/data network 316. Network 316 may include one or more wireless application protocol (WAP) gateways and one or more web gateway systems. Similarly, devices 310-314 may transmit email via switch 318 and internet service provider (ISP) 320. Switch 318 may be a central office (CO) switch such as those used in the public switched telephone network, or may be a softswitch used in data networks and voice-over-IP systems. ISP 320 provides connectivity to internet 322.

Application server 300 may, for example, send the message to client gateway 108 via secure intranet 326, firewall 324, ISP 320 and internet 322 as shown in FIG. 3. It would be apparent to one of ordinary skill in the art that other means of sending the message to gateway 108 may also be used. Although FIG. 3 shows only one ISP and one wireless network providing internet connectivity to each device, there may be multiple ISPs and multiple wireless network service providers as would be apparent to one of ordinary skill in the art. Similarly, there may be multiple switches serving each of devices 310-314 or a single switch may be used as shown in FIG. 3.

Remote Writing (Posting) of Items to Bulletin Board

As noted above, a remote user may post an item (i.e., a message) to the bulletin board system by sending an email message to an address that is routed to application server 300. Upon receipt of the email message, application server 300 may consult customer database 302 to determine whether or not the sender of the email is an authorized user of the electronic bulletin board. Such an authentication step is an optional procedure and may be carried out in a variety of ways. For example, customer database 302 may comprise a list of authorized sender email addresses from which it accepts bulletin board messages. Alternatively, customer database 302 may include a username and password that must be included in the email message.

In this embodiment, the sender's email message may include an addressee such as, for example, "TO: Billy@joneshome.com" and a sender's address such as, for example, "FROM: Jane@Janeswork.com." Application server 300 looks up the addressee's domain name in column 402 in of table 400 in customer database 302 to determine the destination address, that is, an address associated with client gateway 108 at the user's home (or workplace). As shown in FIG. 4A, the destination address (column 404) may be expressed as any network address, such as for example, an IP address or a domain name, among others. Application server 300 may check to see whether or not the sender is authorized to post messages to an electronic bulletin board associated with this destination address. As described above, this step (if implemented) may involve a lookup of the sender's email address (column 406) or may involve verification of a username (column 408) and password (column 410). Alternatively, in some embodiments, open access may be allowed (i.e., application server accepts all messages received and processes them for posting to the electronic bulletin board).

Application server 300 may format the message for delivery to client gateway 108 and display on communications center 100. In an embodiment of the present invention, customer database 302 also includes a mapping of email sending and receiving addresses to provide a more personalized messaging system. For example, customer database 302 may include a table such as table 450 shown in FIG. 4B. In this example, a message received from "Jane@Janeswork.com" is formatted for posting on the electronic bulletin board according to the recipient's address. That is, if Jane is sending a message intended for one of her children (Billy or Jane) application server 300 formats the message to identify the sender as "Mom" and the recipient by his or her first name as shown in rows 452 and 454. However, when a message from "Jane@Janeswork.com" to "Steve@joneshome.com" is received, application server 300 formats the message to be posted to include a sender name "Jane" and a recipient name "Steve" as shown in row 456. Similarly, a message from Jane to "all@joneshome.com" is routed to "Steve & Kids" from "Mom" as shown in row 458.

In another embodiment of the present invention, a user may post a message to the bulletin board system by connecting to application server 300. The connection process may be completed using any suitable network protocol, including, for example, HTTP, Telnet, and the like. Again, there may be an authentication process for verifying the user's rights to access the bulletin board system. Such authentication process may include, for example, checking a list of authorized network addresses that may connect to the server, username and password control, and the like. In this embodiment, the user may be provided a menu of options to select, for example, the sender and receiver names to use for a posted message.

Remote Reading of Bulletin Board Items

Remote retrieval or reading of content on an electronic bulletin board according to an embodiment of the present invention may be accomplished in substantially the same manner as described above. That is, for example, a user may send an email message to application server 300 requesting a download of messages from the bulletin board. In one embodiment, the user may be provided the option of only downloading those items that have not been marked read by the user. In another embodiment, the user may request a subset of messages, for example, only messages addressed to the user. In still other embodiments, the user may be able to select messages from a particular user, messages according to their posting time, or other criteria for identifying messages to be downloaded.

In an embodiment of the present invention, application server 300 maintains a copy of messages sent to client gateway 108. In this embodiment, download requests may be processed at application server 300 without a need to contact client gateway 108. In other embodiments, application server 300 does not maintain copies of messages posted to the bulletin board. In this embodiment, when a download request is received, application server sends a retrieval command to client gateway 108. Client gateway 108 responds to the command and sends requested content either to application server 300 for further processing or directly to the requestor's email address.

In another embodiment of the present invention, a user may read messages or request downloads of messages by logging onto application server 300 using any suitable network protocol as described above. In this embodiment, application server 300 may include, for example, a web server configured to display the bulletin board content via a web browser application. As described above, the user may request all messages, or may select a subset of messages for retrieval.

In an embodiment, application server 300 may check the user's permission to access the bulletin board, as described above. That is, application server 300 may request the user to provide a username and password, or may check the requestor's email or IP address to determine whether or not the request should be honored.

Other Remote Manipulation of Bulletin Board Items

According to an embodiment of the present invention, a user may perform other remote manipulation operations on posted bulletin board items. For example, a user may request removal of an item from a bulletin board. In other embodiments, a user may remotely edit a particular message. Other remote manipulation operations that may be provided in one or more embodiments of the present invention include marking a message as read, replying to a message, changing a position of a posting on the bulletin board, copying a message, mailing a message to another email address, and the like.

In some embodiments, customer database 302 may include access levels for determining which users may perform these or other manipulation operations on one or more messages on the bulletin board. As with other embodiments described herein, the user may be requested to provide user authentication information or application server 300 may use other suitable authentication methods. Furthermore, in some embodiments, the user posting a message on the bulletin board may determine which other users may manipulate the message. For example, a user may "lock" a message to prevent others from deleting it.

Other Alternative Embodiments

In an embodiment of the present invention, special messages may be supported. For example, a special message such as grocery list 208 shown in FIG. 2 may be remotely manipulated. As used herein, grocery list 208 is a "special message" because it need not include an author (i.e., sender) name and need not include an addressee. A user may update grocery list 208 in generally the same manner as described above, except that the user may address the email to, for example, "grocery@joneshome.com." Application server 300 may format the contents of the email to display a message as shown in FIG. 2. Note, that because a grocery list requires no "reply", the menu of options associated with such a message may be customized as shown in the FIG. 2 to eliminate this option. Alternatively, the system may include a "reply" option in the menu.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A non-transitory computer readable medium containing instructions that, when executed by a processor, cause the processor to perform operations, comprising:

providing local access to a locally shared electronic message area presented by a computer including the processor that resides behind a client gateway, wherein the locally shared message area is openly available for viewing and interaction concurrently by a plurality of local users without a user log-in occurring and wherein the locally shared electronic message area includes designated separate areas for presenting for display local message items intended for specified recipients;

receiving requests at the computer, the requests being directed to presenting for display local message items locally and manipulating at least an existing local message item of a set of local message items, the set of local message items being simultaneously displayed via the locally shared electronic message area, the set of local message items including a first message item addressed to a first recipient and a second message item addressed only to a second recipient and not to the first recipient; and in response to receiving the requests, presenting local message items for display on the locally shared electronic message area and manipulating the at least one existing local message item of the set.

2. The non-transitory computer readable medium of claim 1, wherein manipulating the at least one existing local message item includes at least one of reading the existing local message item, deleting the existing local message item, and editing the existing local message item.

3. The non-transitory computer readable medium of claim 1, wherein the set of local message items further includes a third local message item having no specified recipient.

4. The non-transitory computer readable medium of claim 1, wherein the locally shared electronic message area includes a collective area for presenting for display local message items having no specified recipients.

5. The non-transitory computer readable medium of claim 1, wherein at least one of the local message items is presented for display within a designated area of the locally shared electronic message area with an indicator of a party to the at least one local message item.

6. The non-transitory computer readable medium of claim 1, wherein the operations further comprise providing an indicator that a local message item has been presented for display.

7. An electronic display system comprising:
a local display;
a processor; and
a memory, wherein the local display, the processor, and the memory reside behind a client gateway and wherein the memory has instructions stored thereon that, when executed by the processor, cause the processor to perform operations comprising:

providing local access to a locally shared electronic message area of the local display that is openly available for viewing and interaction concurrently by a plurality of local users without a user log-in occurring, wherein the locally shared electronic message area includes designated separate areas for presenting for display local message items intended for specified recipients;

receiving local requests, the requests being directed to presenting for display local message items locally and manipulating at least an existing local message item of a set of local message items, the set of local message items being presented for simultaneous display on the display, the set of local message items including a first message item addressed to a first recipient and a second message item addressed only to a second recipient and not to the first recipient; and in response to receiving the requests, presenting for display the local message items and manipulating the at least one existing local message item of the set.

8. The electronic display system of claim 7, wherein the manipulating the at least one existing local message item includes at least one of reading the existing local message item, deleting the existing local message item, and editing the existing local message item.

9. The electronic display system of claim 7, wherein the set of local message items further includes a third local message item having no specified recipient.

10. The electronic display system of claim 7, wherein the locally shared electronic message area includes a collective area for presenting for display local message items having no specified recipients.

11. The electronic display system of claim 7, wherein at least one of the local message items is presented for display within a designated area of the locally shared message area with an indicator of a party to the at least one local message item.

12. The electronic display system of claim 7, wherein the memory further has instructions stored thereon which, when executed by the processor, cause the processor to provide an indicator that a local message item has been presented for display.

* * * * *